Patented Dec. 20, 1949

2,491,475

UNITED STATES PATENT OFFICE 2,491,475

ENTERIC CAPSULE

Herman H. Bogin, Detroit, Mich., assignor to Parke, Davis & Company, Detroit, Mich., a corporation of Michigan No Drawing. Application March 25, 1946, Serial No. 657,073

9 Claims. (Cl. 167—83)

This invention relates to enteric capsules, and more particularly to hard-shell enteric capsules.

By substances having enteric properties is meant substances which, when administered orally, are soluble in or disintegrated by the alkaline intestinal secretions but which are substantially insoluble in the acid secretions of the stomach.

By hard-shell capsules is meant capsules having walls of sufficient rigidity to maintain their shape under normal conditions. Hard-shell capsules are usually manufactured in two parts, an open ended cylindrical body portion and a cap portion adapted to telescope over the open end of the body. Both body and cap are provided with externally convex rounded ends. Such capsules are usually filled after, rather than during the manufacture of the capsule, by removing the cap from the body, filling the body with the medicinal agent (usually a powdered solid) and replacing the cap thereby completely enclosing the filling material.

In order that a hard-shell capsule may be useful for its intended purpose, the composition of the walls of the capsule must have sufficient rigidity to maintain its size, shape and dimensions so that the cap and body will not stick or weld together. The material almost universally used for hard-shell capsules is gelatin and in order to maintain the necessary hardness and rigidity it is preferable to use pure gelatin without other addition agents (except small amounts of coloring ingredients if desired). Plasticizers are avoided and in no case can a plasticizer be present in amounts exceeding 5% of the dry weight of the gelatin. This is in contradistinction to the composition of soft-shell capsules where plasticizer must be present in amounts substantially greater than 5% in order that the walls will be soft and capable of welding together to seal the capsule portions together during manufacture.

Hard-shell gelatin capsules, as above described, do not have enteric properties and are therefore rapidly dissolved or destroyed in the acid secretions of the stomach.

In the past capsules made entirely of gelatin have been coated with materials having enteric properties in order to render such capsules enteric. This coating procedure is carried out by dissolving the enteric material in an organic solvent to form a dope or lac which is then applied to the capsule or to the separate portions of the same. However, such coatings have the undesirable characteristics of cracking and peeling from the capsule, thus exposing the non-enteric portion of the capsule to the action of the gastric juices. This non-enteric portion of the capsule quickly dissolves on contact with the gastric juices thus resulting in the loss of the therapeutic value of the capsulated medicinal. Moreover, enteric coatings are very difficult to apply to gelatin capsules and it is necessary to apply many coats of the dope or lac containing the enteric material before a coating possessing the necessary thickness to withstand the attack of the gastric juices can be built up.

If capsule coatings of sufficient thickness are built up they are often not uniform in thickness from one part of the capsule to another and this requires an excess of coating material in order to be sure that all parts are well covered. On the other hand, with such heavy coating, they may fail to dissolve with sufficient rapidity in the intestine and the medicament is carried into a zone of the intestine where little or no absorption takes place, or the coated capsule may even pass undissolved through the body. Furthermore, such enteric coatings become more brittle and subject to cracking and peeling with the application of each coat of the dope or lac and the end result is usually a capsule which is entirely unsuited for the administration of medicinals.

Another important consideration from the production standpoint is that each thin coat of the enteric material must be allowed to dry thoroughly before applying the next coat of the enteric dope. This is obviously a very costly procedure. Moreover, enteric coatings are customarily applied only to gelatin capsules which already contain a medicinal. This makes it impossible to apply a uniform enteric coating, as one side of the capsule must rest on a conveyor belt or a pan during the drying process. The obvious alternative is to coat the outside of the two separate unfilled portions of the capsule, and thereafter fill and put the two parts together. However, this is very difficult, because the empty cap of the uncoated gelatin capsule must be made sufficiently large to fit the body loosely, but small enough so that it will fit tightly after the coating is applied to the body of the capsule. This requires that a uniform and critical thickness of the enteric coating be applied to the body of the capsule in order to secure a tight fit of these two telescoping members. It also requires that both the body and the cap of the gelatin capsule do not swell or shrink during the coating process. Such requirements are obviously difficult or almost impossible to meet.

Attempts have been made to produce enteric capsules by the tanning of gelatin capsules. This tanning process is carried out by treating the capsule with gaseous formaldehyde or a solution of the same. While the tanning of gelatin capsules does result in the production of less soluble capsules, it is impossible to obtain tanned capsules having uniform solubility because the insolubility imparted to the capsules is due merely to raising the melting point of the gelatin and not to any increased resistance to acid or solubility in alkali. Thus the capsules produced by this method may be too soluble and disintegrate or dissolve in the stomach, or they may be so insoluble that they even pass completely through the intestine without dissolving.

These tanned gelatin capsules are also unsatisfactory because they swell considerably in acid solution so that the body and the cap portions of the capsules tend to separate and come apart. If the capsule has been previously banded or sealed to prevent separation, the extreme swelling of the capsule results in the walls becoming so thin that osmosis or diffusion through the wall takes place, resulting in contact between the capsule contents and the stomach juices.

In general, medicinal substances are more readily utilized and are of greater therapeutic value if they are absorbed from the upper portion of the intestine. Medical science has long sought to provide efficient means for rendering such substances available for absorption from the intestinal tract. This problem arises from the fact that many medicinals are either not absorbed from the stomach or rapidly destroyed on contact with the acid present in the stomach. Some examples of medicinals of this type are gland products and penicillin. Many medicinals, such as hog bile, atabrine, sulfa drugs and the like, also are very unpleasant to take and cause severe gastric disturbances which may be coupled with very unpleasant regurgitation of the drug. Another use for enteric capsules is to prevent the breakdown or dilution of drugs which are used for their effect in the intestinal tract, such as intestinal antiseptics or anthelmintics. It is obvious that there is a great need for a practical method of administering medicinals of the above types in an enteric form.

It is an object of this invention to provide a hard-shell capsule which requires no further coating or treatment to impart enteric properties thereto, but which is composed of a homogeneous material possessing enteric properties.

Another object of the invention is to provide a practical, cheap, rapid and efficient method of manufacturing hard-shell capsules having enteric properties.

It is also an object of this invention to provide a means which will enable the utilization of medicinal agents by absorption from the intestinal tract.

A further object of the invention is to provide a hard-shell enteric capsule which is resistant to high humidity conditions and is not readily subject to attack by living organisms such as molds or bacteria.

I have found that hard-shell enteric capsules, the walls of which are composed entirely of a homogeneous enteric material, can be prepared from a solution of a material possessing setting properties, such as gelatin, and a water soluble, alkali metal salt of a partial ester of a polycarboxylic acid and a suitable cellulose ester. In accordance with the present invention these hard-shell enteric capsules can be made by preparing a homogeneous aqueous solution of the two essential ingredients into which previously lubricated pins or molds are dipped and the pins or molds with their adhering materials withdrawn and cooled. After drying the material on the pins in the usual manner, it is trimmed and the finished half of the hard-shell enteric capsule removed from the pin. This member is joined with, or telescoped into, the other half of the capsule in conventional manner to form the finished capsule.

I have also found that my new hard-shell enteric capsules are extremely resistant to attack by stomach acids but are rapidly disintegrated and dissolved in the alkaline medium of the intestines thereby releasing the enclosed medicament in the upper region or absorptive zone of the intestines. This is an important feature of my new products as it assures protection of, and also protection of the stomach from, the capsulated medicament until the capsule passes from the stomach into the intestine where the desired rapid destruction of the capsule and release of the medicant enclosed therein takes place. Another important feature of my new capsules is that the cap portion does not expand away from the body portion of the capsule on contact with water or dilute acid. This property of my new capsules insures a tight fit of the body and cap portions of the capsule and thus eliminates the possibility of the capsule leaking or coming apart in the stomach.

To prepare my new enteric capsules I first dissolve the partial ester of a polycarboxylic acid and a cellulose carboxylate derivative containing free carboxyl groups in an aqueous solution of an alkali metal base to obtain an aqueous solution of the corresponding alkali metal salt of the cellulose ester. Some examples of the alkaline reagents which I may use for this purpose are sodium bicarbonate, sodium carbonate, potassium carbonate, sodium hydroxide, trisodium phosphate, sodium perborate, potassium hydroxide, lithium hydroxide and lithium carbonate. In making these aqueous solutions containing the salts of the cellulosic esters I prefer to use just enough alkali to effect the solution of the ester, as any excess alkali present in the final solution tends to destroy or alter the gelatin. However, if desired, an excess of alkali may be used and the excess alkali present in the resultant solution neutralized with acid before adding the gelatin; or, the solution may be heated until the pH falls to the proper value. The pH of the solution should preferably be on the acid side and about the same as that of the gelatin itself. The proper amount of alkali to use may be readily determined by a simple test on a small sample or it may be calculated if one knows the percentage of free carboxyl groups present in the cellulosic partial ester.

I next add the aqueous gelatin solution to the aqueous solution containing the alkali metal salt of the partial ester of a polycarboxylic acid and a cellulose carboxylate derivative. The mixture is then heated until a homogeneous viscous aqueous solution is obtained. Previously lubricated pins or molds are then immersed in the solution, withdrawn and the material on the pins set by cooling it at a temperature of less than about 65° F. The moisture in the material on the pins is removed in the conventional manner with dehumidified air and the material removed from the pin. It is then trimmed or cut and joined with the other portion of the capsule.

The cooling feature of the process is a very critical step because the solution adhering to the pins or molds does not set as rapidly as gelatin itself, but tends to run and produce a capsule with uneven walls. I have found that this cooling may be conveniently and rapidly accomplished by blowing cool air across the coated pins or molds. However, it should be understood that while this is the preferred method of cooling, the invention is not limited to this particular method.

In carrying out my invention I use polycarboxylic acid partial esters of cellulose esters of lower aliphatic monocarboxylic acids. These cellulosic derivatives which contain free carboxyl groups may be made by known methods of preparation, such as those disclosed in United States Patents Nos. 2,093,462 and 2,093,464 and also 2,126,460. For example, cellulose or cellulosic derivatives containing free hydroxyl groups can be reacted with a polycarboxylic acid acylating agent, such as an anhydride of the polycarboxylic acid, in the presence of a base, or in the presence of a solvent and in the absence of an organic base. These partial esters of the various cellulosic derivatives may be simple esters of polycarboxylic acids or they may be mixed esters wherein more than one kind of polycarboxylic acid group is present. I may use the reaction products of polycarboxylic acid anhydrides with cellulose esters containing free hydroxyl groups capable of combining with the same or different acid anhydride of a polycarboxylic acid to form an ester linkage and also increase the number of free carboxylic acid groups present. Such anhydrides are, for example, phthalic, succinic and maleic anhydrides. Examples of cellulose derivatives containing free hydroxyls in the cellulose part of the molecule which may be acylated are cellulose acetate, cellulose propionate, cellulose acetate-propionate, cellulose butyrate, etc.

I prefer to use the mixed cellulose esters of a lower aliphatic monobasic acid and a polybasic acid, such as phthalic acid, with at least one free unesterified carboxylic acid group present in the polybasic acid portions of the molecule, e. g. cellulose-acetate-phthalate, cellulose-propionate-phthalate and the like. Free carboxyl groups need not be present in molecular portions to the polycarboxylic acid portion of the molecule but the ester may have any free carboxyl content from about 5 to 25% by weight. A free carboxyl group content of between about 8 and 15% by weight has been found preferable in the preparation of my new enteric capsules, as capsules prepared from such cellulose derivatives disintegrate rapidly on contact with the alkaline secretions of the intestines and also possess better physical properties such as resilience, etc.

As stated above, I combine an aqueous solution of an alkali metal salt of a cellulose derivative, such as cellulose-actate-phthalate, with gelatin and use the resultant homogeneous aqueous solution in the preparation of my new enteric capsules. This homogeneous solution containing the essential ingredients of my new capsules must be an aqueous solution. This is due to the fact that gelatin is insoluble in organic solvents such as alcohol, acetone, ether and like solvents which readily dissolve the free carboxylic acid cellulose ester derivatives which I use as starting materials. Conversely, these free carboxylic acid cellulose ester derivatives are not soluble in water whereas gelatin is. Thus it is readily apparent that without first converting these cellulosic esters to a water-soluble salt it is impossible to obtain a homogeneous mixture of the two components which is suitable for use in making enteric capsules.

I have found that the gelatin-cellulosic material weight ratio is a critical factor in the preparation of my new enteric capsules. This arises from the fact that a sufficient quantity of a salt of the cellulose derivative must be present in the finished capsule to render it insoluble in the stomach acids but the quantity must not be so great as to prevent the rapid solution of the capsule when it comes in contact with the alkaline secretions of the intestine. The amount of the cellulosic salt present in the final capsule is also limited by the fact that if too much is present the capsule is brittle. Moreover, difficulties are encountered during the manufacture of such capsules whenever sufficient gelatin is not present to set the material on the pin or mold and thus prevent the material from running. I have found that the best results are obtained by starting with about 4 to 9 parts by weight of gelatin to 1 part by weight of the un-neutralized cellulose derivative. In the case of cellulose-acetate-phthalate I find that particularly valuable enteric capsules are obtained by starting with about 5.6 parts by weight of gelatin and 1 part by weight of cellulose-acetate-phthalate. Of course, the optimum proportions will vary somewhat with the individual cellulose derivatives used and with the molecular weight of the same as well as with the grade or type of gelatin used. However, these proportions may be readily ascertained by simple experiment.

It should be understood that, strictly speaking, the expression "parts by weight" can only be properly applied to the parts by weight of the individual starting materials in the form in which they are customarily obtained as articles of commerce, due to the lack of an analytical method for determining the amounts of the various materials present in the finished capsule. However, since the gain in weight of the cellulosic material due to neutralization is small, the parts by weight of the salt of the cellulosic material present in the finished capsule may be considered to be the same as the parts by weight of the un-neutralized cellulosic material used as the starting material.

The amount of water which I use in the preparation of the aqueous solution containing the gelatin and the salt of the cellulose derivative depends to a great extent on the wall thickness desired in the finished capsule. For instance, if a thin walled capsule is desired, more water is used in the preparation of the solution, whereas if a thick-walled capsule is desired a more concentrated or viscous solution is used. For example, I have found when starting with 5.6 parts by weight of gelatin and 1 part by weight of cellulose-acetate-phthalate that the aqueous solution should have a viscosity of between about 150 to 300 seconds Stormer at 120° F. in order to produce capsules having a wall thickness of about 0.004 inch. While the amount of water necessary to produce a solution of the desired viscosity for making a capsule of a previously determined wall thickness will vary slightly with the cellulose derivative and the gelatin used, it may be readily determined by a simple experiment. Such an experiment may be carried out by making up a very viscous solution from known amounts of materials and then adding measured amounts of water to the solution until the desired viscosity is obtained.

The wall thickness of the capsule is also dependent upon the temperature of the aqueous solution of gelatin and salt of the cellulose derivative. This factor, however, is maintained fairly constant since an appreciable change in temperature is necessary in order to produce a small change in wall thickness and it is undesirable from a practical standpoint to vary the temperature over large ranges. Therefore, when producing my new capsules on automatic machines such as that described in U. S. Patent No.

1,787,777, the gelatin-cellulose salt solution in the dipping pans is kept at a fairly constant temperature between about 95 and 125° F. and preferably in the neighborhood of about 110° F.

I have found that coloring agents may be added to my new enteric capsules without destroying or altering any of their valuable chemical or physical properties. Different colors of these colored capsules may be used to capsulate similar appearing medicinals and thus prevent accidents due to the ingestion of the wrong medicament. Some of the coloring agents which I may use are Erythrosene, Fast Green, Brilliant Blue, Amaranth, Magenta, Tartrazine and the like.

I may produce my new enteric hard-shell capsules in any of the customary forms for hardshell capsules. However, I prefer to make my new capsules in the form of the conventional telescoping gelatin capsule. Such capsules consist of two separate cylindrical units each with a closed rounded end, the units being of such diameters that the open end of one member or unit will telescope into the open end of the other member to form the finished capsule. A modification which I may make in my new enteric capsules of the preferred design is that the two units of the filled capsule may be sealed together by means of an encircling band. This band or weld is preferably composed of the same material as that used in the preparation of the capsule. However, this band may also be composed of gelatin or some other resinous sealing material. The composition of this band is immaterial as it does not affect the enteric properties of the capsule but merely seals the two members of the capsule together to prevent accidental separation. This banding of the capsules hermetically seals them against air, moisture, etc.

While the hard-shell capsules of my invention are usually composed solely of an alkali metal salt of a cellulose derivative, gelatin and, if desired, a coloring agent, it is permissible to incorporate a plasticizer also, provided that the amount is not large enough to change the essential requirements of hardness and rigidity necessary for a practical hard-shell capsule. Thus up to 5% (by weight of the dry gelatin) of a plasticizer, such as glycerine or propylene glycol may be added, if desired, and the enteric properties produced by the incorporation of the cellulose derivative are still retained when the composition contains this small proportion of plasticizer.

The invention is illustrated by the following example.

A finely divided mixture consisting of 0.96 lb. of sodium carbonate monohydrate and 6 lbs. of cellulose acetate phthalate (—COOH content= 10.7%) is added with stirring to 36 lbs. of water at 180° F. In order to reduce frothing of the mixture, a small amount of glycerol oleate (1.2 fluid oz.) may be added. After solution is complete, the mixture is allowed to cool and stand overnight. The pH of this solution is 5.9±0.1.

In a separate container 34 lbs. of ossein gelatin (Bloom 240 gms.) is soaked in water until the mass weighs 85 lbs. The gelatin is removed, melted at 140° F. and added with rapid stirring to the sodium salt of cellulose-acetate-phthalate solution. (If a colored capsule is desired about 3½ oz. of dye are stirred into the solution at this point.) The resultant solution is heated at 120° F. for four to twelve hours to insure homogenity of the solution. After a homogeneous solution is obtained, the solution is placed in a dipping pan and maintained at a temperature of 115° F. while previously lubricated pins or molds are dipped into the solution. The pins are withdrawn and cool air (60° F.) blown on the material adhering to the pins to set it. The capsule halves thus formed are dried with dehumidified air, trimmed, removed from the pins and joined together with the other halves of the capsule to form the finished hard-shell capsule.

The capsules obtained in the above manner have a uniform wall thickness of about 0.004 inch. The finished capsules contain about 10% by weight of moisture and are sufficiently resilient to resist cracking even when the opposite walls are pressed together. These capsules do not become appreciably more brittle even when heated for hours at 90° F. in an atmosphere having a relative humidity of only 25%. When these new capsules are placed in cold air saturated with water vapor they maintain their shape much better than the gelatin capsules used as control samples.

The new capsules of the present invention are tested for their enteric properties under conditions designed to simulate the conditions of the human body as closely as possible. To simulate the acidic conditions in the stomach a 0.25% hydrochloric acid solution containing 0.04% pepsin is used. The alkaline conditions of the intestines are reproduced by use of a 2% sodium bicarbonate solution. Both the acid and alkaline tests are carried out at 37° C. or at approximately body temperature and the capsule is filled with lactose or a similar material to make it sink in the test solution. The new enteric capsules of the example do not come apart, dissolve or disintegrate for several hours when subjected to the acid treatment. However, they dissolve completely in a few minutes in the sodium bicarbonate solution.

The enteric capsules prepared as described above are filled with any suitable medicinal in the usual manner and, if desired, the joined capsules sealed by applying a band of the same solution used in preparing the capsule itself. The band is set with cool air and allowed to dry. This band may be applied by holding the capsule at both ends and rotating it in front of and in contact with a suitable source of the sealing medium located precisely opposite the cut edge of the cap part of the capsule. The sealing medium may be conveyed to the capsule in any suitable way as by means of a brush or by a suitable nozzle. The resultant capsule has the same enteric properties as the unbanded capsules but it is tightly sealed against accidental separation, moisture and other outside influences. Some of the subject matter disclosed herein is disclosed and claimed in my copending application entitled Process and apparatus for manufacturing capsules, Serial No. 60,006, filed November 15, 1948, as a continuation-in-part of the instant case.

What I claim as my invention is:

1. A medicinal capsule comprising telescopically engaged body and cap portions, the walls of which are composed of a homogeneous enteric composition comprising gelatin, an alkali metal carboxylate salt of the acid form of a polycarboxylic acid partial ester of a cellulose ester of a lower aliphatic monocarboxylic acid and from 0 to 5% of a plasticizer, said enteric composition having a hardness sufficient to permit telescopic engagement of said body and cap portions, and said homogeneous composition itself having enteric properties.

2. A medicinal capsule comprising telescopically engaged body and cap portions, the walls of which are composed of a homogeneous enteric composition comprising gelatin, an alkali metal carboxylate salt of the acid form of a polycarboxylic acid partial ester of a cellulose ester of a lower aliphatic monocarboxylic acid, and from 0 to 5% of a plasticizer, said gelatin being present in the proportion of about 4 to 9 parts by weight thereof to 1 part by weight of said acid form of said ester, said enteric composition having a hardness sufficient to permit telescopic engagement of said body and cap portions, and said homogeneous composition itself having enteric properties.

3. A medicinal capsule comprising telescopically engaged body and cap portions, the walls of which are composed of a homogeneous enteric composition comprising gelatin, an alkali metal carboxylate salt of the acid form of a polycarboxylic acid partial ester of a cellulose ester of a lower aliphatic monocarboxylic acid, said partial ester before its conversion to the salt having a free carboxyl group content of between about 8 and 15% by weight, and from 0 to 5% of a plasticizer, said gelatin being present in the proportion of about 4 to 9 parts by weight thereof to 1 part by weight of said acid form of said ester, said enteric composition having a hardness sufficient to permit telescopic engagement of said body and cap portions, and said homogeneous composition itself having enteric properties.

4. A medicinal capsule comprising telescopically engaged body and cap portion, the walls of which are composed of a homogeneous enteric composition comprising gelatin, an alkali metal carboxylate salt of the acid form of a phthalic acid partial ester of a cellulose ester of a lower aliphatic monocarboxylic acid, said partial ester before its conversion to the salt having a free carboxyl group content of between about 8 and 15% by weight, and from 0 to 5% of a plasticizer, said gelatin being present in the proportion of about 4 to 9 parts by weight thereof to 1 part by weight of said acid form of said ester, said enteric composition having a hardness sufficient to permit telescopic engagement of said body and cap portions, and said homogeneous composition itself having enteric properties.

5. A medicinal capsule comprising telescopically engaged body and cap portions, the walls of which are composed of a homogeneous enteric composition consisting essentially of gelatin, an alkali metal carboxylic salt of the acid form of cellulose-acetate-phthalate, said phthalate ester before its conversion to the salt having a free carboxyl group content of between about 8 and 15% by weight, said gelatin being present in the proportion of about 4 to 9 parts by weight thereof to 1 part by weight of said acid form of cellulose acetate phthalate, said enteric composition being substantially free from added plasticizer and having a hardness sufficient to permit telescopic engagement of said body and cap portions, and said homogeneous composition itself having enteric properties.

6. A medicinal capsule comprising telescopically engaged body and cap portions, the walls of which are composed of a homogeneous enteric composition consisting essentially of gelatin, a water-soluble sodium salt of the acid form of a cellulose-acetate-phthalate, said phthalate ester before its conversion to the salt having a free carboxyl group content of between about 8 and 15% by weight, said gelatin being present in the proportion of about 5.5 parts by weight thereof to one part by weight of said acid form of cellulose acetate phthalate, said enteric composition being substantially free from added plasticizer and having a hardness sufficient to permit telescopic engagement of said body and cap portions, and said homogeneous composition itself having enteric properties.

7. As a new article of manufacture, a medicament enclosed within a hard-shell two-part enteric capsule, the walls of which are composed of a homogeneous enteric composition comprising gelatin, an alkali metal carboxylate salt of the acid form of a polycarboxylic acid partial ester of a cellulose ester of a lower aliphatic monocarboxylic acid, and from 0 to 5% of a plasticizer, said gelatin being present in the proportion of about 4 to 9 parts by weight thereof to one part by weight of said acid form of said ester, said enteric composition having a hardness sufficient to permit telescopic engagement of said body and cap portions, and said homogeneous composition itself having enteric properties.

8. As a new article of manufacture, a medicament enclosed within a hard-shell enteric capsule comprising telescopically engaged body and cap portions with oppositely disposed convex rounded ends, the walls of said capsule being composed of a homogeneous enteric composition consisting essentially of gelatin, an alkali metal carboxylate salt of the acid form of a polycarboxylic acid partial ester of a cellulose ester of a lower aliphatic monocarboxylic acid, and from 0 to 5% of a plasticizer, said gelatin being present in the proportion of about 4 to 9 parts by weight thereof to 1 part by weight of said acid form of said ester, said enteric composition having a hardness sufficient to permit telescopic engagement of said body and cap portions to enclose said medicament, and said homogeneous composition itself having enteric properties.

9. As a new article of manufacture, a medicament enclosed within a hard-shell enteric capsule comprising telescopically engaged body and cap portions with oppositely disposed convex rounded ends and a circular sealing band integrally united to both said body and cap and enveloping the annular edge of said cap, the walls of said capsule being composed of a homogeneous enteric composition consisting essentially of gelatin, an alkali metal carboxylate salt of the acid form of a polycarboxylic acid partial ester of a cellulose ester of a lower aliphatic monocarboxylic acid, and from 0 to 5% of a plasticizer, said gelatin being present in the proportion of about 4 to 9 parts by weight thereof to 1 part by weight of said acid form of said ester, said enteric composition having a hardness sufficient to permit telescopic engagement of said body and cap portions to enclose said medicament, and said homogeneous composition itself having enteric properties.

HERMAN H. BOGIN.

REFERENCES CITED

The following references are of record in the file of this patent:

UNITED STATES PATENTS

| Number | Name | Date |
| --- | --- | --- |
| 1,861,047 | Colton | May 31, 1932 |
| 2,196,768 | Hiatt | Apr. 9, 1940 |
| 2,390,088 | Fox et al. | Dec. 4, 1945 |